UNITED STATES PATENT OFFICE.

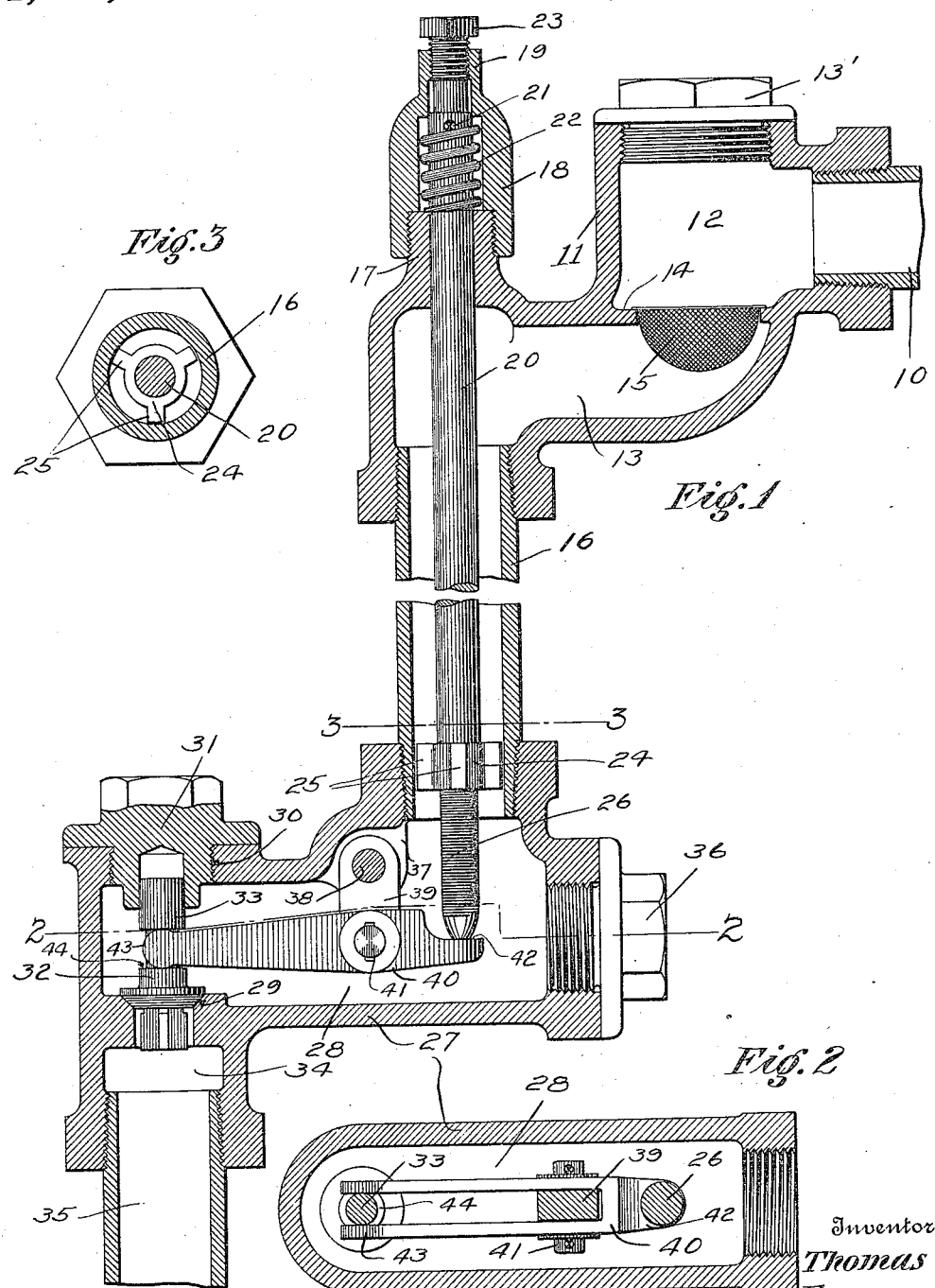

THOMAS FERGUSON, OF OAKLAND, CALIFORNIA, ASSIGNOR TO L. M. MacDERMOT, OF OAKLAND, CALIFORNIA.

STEAM-TRAP.

1,069,775.  Specification of Letters Patent.  Patented Aug. 12, 1913.

Application filed July 26, 1912. Serial No. 711,614.

*To all whom it may concern:*

Be it known that I, THOMAS FERGUSON, citizen of the United States, residing at Oakland, in the county of Alameda and State of California, have invented certain new and useful Improvements in Steam-Traps, of which the following is a specification.

This invention relates to steam traps and has special reference to an improved form of trap for intermittently relieving a steam line of water.

The principal object of the invention is to improve and simplify the general construction of devices of this character.

A second object of the invention is to provide an improved construction of thermostatic release valve.

A third object of the invention is to provide an improved intermittent trap.

With the above and other objects in view as will be hereinafter apparent the invention consists in general of certain novel constructions, combinations and arrangements of parts as will be hereinafter fully described, illustrated, and claimed.

In the drawings: Figure 1 is a vertical median section through a trap constructed in accordance with this invention. Fig. 2 is a section on the line 2—2, Fig. 1. Fig. 3 is a section on the line 3—3, Fig. 1.

In carrying out the construction of this invention there is provided at a suitable place on the steam line 10 a casing 11 wherein is formed a receiving chamber 12 from which extends an outlet passage 13. The receiving chamber 12 is threaded for the reception of the pipe line 10 and is also provided with a threaded opening closed by a plug 13'. Beneath this plug 13' is a seat 14 whereon is held a strainer 15. The mouth of the passage 13 is threaded for the reception of a tube 16 which is preferably made of some material having a high linear co-efficient of expansion under heat variations. The casing 11 is prolonged upward to form a boss 17 which is in alinement with the tube 16 and is threaded interiorly to receive a hollow cap 18 having a threaded mouth 19. The boss 17 is provided with a suitable opening through which extends a rod 20 of material having a low linear co-efficient of expansion under heat influences and this rod extends upward into the hollow cap 18 being provided at its upper end with a pin 21. Between the pin 21 and the boss 17 is a coil spring 22 which normally holds the rod elevated.

Threaded into the neck 19 is an adjusting screw 23 by means of which the position of the rod 20 may be varied. On the lower end of this rod is fitted a guide member 24 provided with wings 25 which serve to center this lower end, the guide member being screwed on a threaded portion 26 formed on the rod 20.

Secured on the lower end of the tube 16 is a casing 27 provided with a passage 28 which has at one extremity a valve seat 29 arranged in alinement with an opening 30 normally closed by a hollow plug 31. The valve 32 is provided with a stem 33 which works in the hollow plug and this valve is arranged to seat on the valve seat 29. The casing 27 is continued below this valve seat to provide an outlet passage 34 whereto is attached the waste pipe 35. The other end of the passage 28 is provided with an opening normally closed by a plug 36 so that access is afforded to the interior of the passage. Depending within the casing are lugs 37 carrying a pivot bolt 38 on which is suspended a link 39.

At 40 is indicated a lever one end whereof is bifurcated and between the arms of this bifurcated end is received the link 39 which is held in position by means of a pivot bolt 41, and one end of the lever 40 is flattened as at 42 and against this flattened end rests the lower end of the rod 20. The other end of the lever 40 has its arms rounded as at 43 and these rounded arm ends are received in a groove 44 formed on the stem 33 so that as the lever moves the valve will be opened or closed.

In the operation of this form of the device when steam enters the various passages and the tube 16, the latter will expand while the rod 20 will not expand to such an extent. In consequence of this the casing 27 will be moved away from the casing 11 thus enabling the valve 32 to close. The steam in the tube 16 and casing 27 will then condense and as the tube 16 cools off it will contract and the water of condensation will gradually accumulate in such time as the rod 20 engages the lever end 42 and raises the valve 32; thereupon the steam pressure will force the water of condensation out of the pipe 35 and as the steam flows through the tube 16 it will again expand and close the valve.

Having thus described the invention, what is claimed as new, is:—

In a device of the kind described, an upper casing, a lower casing, a tube having a relatively high linear co-efficient expansion connecting said casings, a hollow boss on the upper casing in alinement with the said casing, a hollow cap mounted on said boss, a rod having a relatively low linear co-efficient expansion extending through said hollow boss and passing down said tube into the lower casing, a pin extending through the upper part of said rod in said cap, a spring surrounding said rod between said pin and the upper end of said boss, an adjusting screw threaded in said cap and bearing against the upper end of said rod, a depending link pivoted within the lower casing, a lever having a bifurcated portion embracing the lower end of said link, a pivot pin extending through said lever and link, said lever being provided with a flattened end against which the lower end of said rod is adapted to bear, a valve seat formed in said lower casing, a valve provided with a grooved stem to receive the end of the bifurcated portion of the lever, said valve being arranged to seat on said valve seat, and guide means for the stem of said valve.

In testimony whereof I affix my signature in presence of two witnesses.

THOMAS FERGUSON.

Witnesses:
L. M. MacDermot,
Paul Luvergne.

---

Copies of this patent may be obtained for five cents each, by addressing the "Commissioner of Patents, Washington, D. C."